No. 663,815.  
C. B. MANSELL.  
CREAM WHIPPING DEVICE.  
(Application filed Mar. 22, 1900.)  
Patented Dec. 11, 1900.
(No Model.)
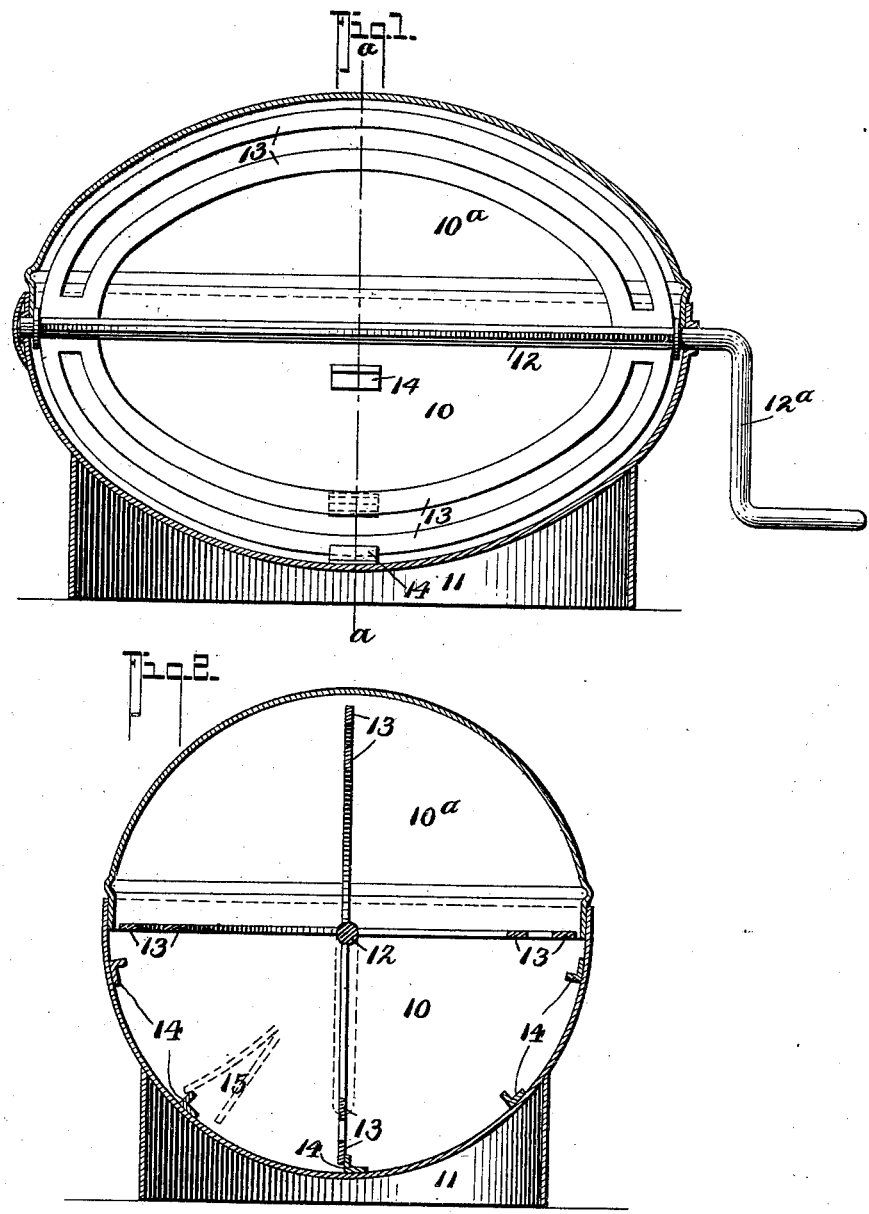
WITNESSES:  
A. E. Dieterich  
Louis Dieterich
INVENTOR  
C. B. Mansell.  
BY  
Fred G. Dieterich  
ATTORNEY

UNITED STATES PATENT OFFICE.

CALEB BINGHAM MANSELL, OF VANCOUVER, CANADA.

CREAM-WHIPPING DEVICE.

SPECIFICATION forming part of Letters Patent No. 663,815, dated December 11, 1900.

Application filed March 22, 1900. Serial No. 9,761. (No model.)

*To all whom it may concern:*

Be it known that I, CALEB BINGHAM MANSELL, a citizen of the Dominion of Canada, residing at Vancouver, in the Province of British Columbia, Canada, have invented a new and useful Cream-Whipping Device, of which the following is a specification.

My invention relates to improvements in devices for whisking cream or beating eggs in which I employ an oval vessel with a horizontal shaft mounted therein with whisking-blades thereon of some resilient material; and my object is to cause the blades to be vibrated rapidly by providing obstructions fixed to the lower inner wall of the vessel in the path of said blades, and thus cause the blades to agitate the material while being passed therethrough.

In illustrating the mechanism by which I attain the above object, Figure 1 shows a side sectional elevation of my invention, and Fig. 2 is a cross-section on the line $a\,a$ in Fig. 1.

The invention consists of an oval body divided horizontally in halves, as 10 and 10$^a$, the section 10 being the lower half, which is held in a horizontal position by a suitable support 11, composed of a vertical plate made to receive and soldered to the outer opposite sides of the section 10. The upper section of the vessel 10$^a$, forming the lid, is designed to fit into the lower section, so that the cream or other material being whisked that is thrown upward will not escape to the outside as it gravitates back into the vessel proper.

Detachably mounted across the major axis of the vessel 10 is a shaft 12, having a crank-handle 12$^a$. Secured to this shaft 12 are elliptical-shaped blades 13, which when the shaft is turned move in close proximity to the inner sides of the sections 10 and 10$^a$. These blades 13 are made of some resilient material, and as the shaft is turned they are brought in contact with fixed projections 14 in the vessel 10, which causes them to vibrate quickly, and consequently impart a greater measure of agitation to the blades than would be the case if the blades were not retarded at intervals by the projections. To increase the resiliency of the blades 13, and thereby allow for their bending the more freely and with decreased danger of breaking as they engage with and pass over the projections 14, the said blades are slotted in the direction of their length, as clearly shown in Fig. 1.

The dotted line (indicated by the numeral 15 in Fig. 2) indicates the approximate vibratory movement imparted to the blades by the projections retarding the same. This avoids the necessity of turning the shaft 12 at a speed faster than the convenient movement of the hand, and thus doing away with speed-gear usual to other devices having the same object in view. Another advantage is the simplicity of construction and facilities for cleaning the internal parts.

Having now described my invention, what I claim, and desire to be protected in by Letters Patent, is—

1. The combination with a vessel circular in cross-section, said vessel having retarding projections on its inner face extended in the path of the movement of the whipping-blades; of a shaft journaled lengthwise of the vessel, said shaft having blades projected radially therefrom, said blades being of an elastic material, substantially as shown and for the purposes described.

2. The combination with a vessel of spheroidal form, said vessel having a series of retarding projections extended radially inward, of the shaft passing through the major axis of the vessel; elastic blades slotted in the direction of their length, the outer extremities of the said blades moving in close proximity to the walls of the vessel, whereby to engage with the retarding projections as the said shaft is rotated, substantially as shown and for the purposes described.

CALEB BINGHAM MANSELL.

Witnesses:
ROWLAND BRITTAIN,
W. G. TRETHEWEY.